Oct. 20, 1970       THOMAS O. PAINE, DEPUTY       3,534,909
        ADMINISTRATOR OF THE NATIONAL AERONAUTICS
                  AND SPACE ADMINISTRATION
          CONTROL VALVE AND CO-AXIAL VARIABLE INJECTOR
                    Filed May 21, 1968

INVENTORS
LOUIS A. ROSALES
ALBERT L. YOUNG

ATTORNEYS

United States Patent Office 3,534,909
Patented Oct. 20, 1970

3,534,909
CONTROL VALVE AND CO-AXIAL VARIABLE INJECTOR
Thomas O. Paine, Deputy Administrator of the National Aeronautics and Space Administration, with respect to an invention of Louis A. Rosales, Manhattan Beach, and Albert L. Young, Rolling Hills Estates, Calif.
Filed May 21, 1968, Ser. No. 730,734
Int. Cl. B05b 7/12
U.S. Cl. 239—416      7 Claims

ABSTRACT OF THE DISCLOSURE

A bi-liquid flow control valve has been combined with a variable thrust injector into an integral compact device. The housing of the device includes a set of concentric cylinders which are joined by an annular plate which divides the housing into a set of valve chambers. An arcuate shaped protrusion is supported on each face of the plate. An annular flow control passage is formed in each valve chamber by means of a semi-toroidal flexible diaphragm which is mounted to surround at least a portion of the protrusion. A set of injector passages are formed on each side of the inner concentric cylinder and a pintle head is mounted to face a bi-liquid injector orifice formed at the terminus of the inner cylinder. The outer surface of each diaphragm is attached to a cylindrical sleeve which is flexurally mounted for axial movement with respect to the housing whereby on movement of said sleeves, the flow rate is controlled by varying the gap between the protrusion and the diaphragm. On axial movement of the housing, the pintle gap is controlled by varying the space between the pintle head and the extremity of the bi-liquid injector.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Field of the invention

The present invention relates to an integral valve and injector and more particularly to a bi-propellant mixture ratio and flow controlling valve and a variable thrust injector.

Description of the prior art

Velocity and injection control of reactive high energy propellants is complicated in existing designs by problems such as sealing and lubrication of sliding or rotating parts, actuation methods and fabrication problems. Dynamic seals are extremely unreliable when subjected to high velocity flow of reactive high energy propellants. Organic seals can be dissolved by the propellant and inter-propellant welds may permit leakage of propellant across the weld causing inter-valve explosion. Furthermore, a satisfactory flow controller should have a high throttling capability preferably as high as 10:1, should permit cavitation of the propellant and desirably be capable of complete shutoff.

OBJECTS AND SUMMARY OF THE INVENTION

It is therefore an object of the invention to provide a propellant mixture ratio and flow control valve with a variable thrust injector in a single compact package.

A further object of the invention is the provision of an integral bi-propellant control valve and variable injector for the control and injection of two fluids such as a high energy liquid fuel and oxidizer using only flexural movement.

Yet another object of the invention is to provide a device having the characteristics described which avoids using rolling and sliding parts, inter-propellant welds and static or dynamic seals.

A still further object of the invention is the provision of an all-metal welded construction bi-propellant valve and injector that is simple to fabricate and permits mixture ratio and injector control by axial movement of flexurally mounted members without any sliding or rotation.

A still further object is to provide a propellant flow controller and injector exhibiting throttling capability, shutoff capability, cavitation controlled flow rate and injector control in a single compact package including the actuating means.

These and other objects and many attending advantages of the invention will become apparent as the description proceeds.

The bi-liquid mixture ratio flow control valve and injector of the invention includes a housing supporting a member on which is mounted a plurality of arcuate annular protrusions. Each protrusion is at least partially surrounded by a flexible semi-toroidal member to define an annular valve chamber. At least one edge of each semi-toroidal member is attached to a cylinder flexurally mounted for axially movement. The housing further includes means for mounting an injector head and flexurally mounted means for delivering the output of each valve chamber to said injector head. On axial movement of said cylinder, the semi-toroidal member is biased toward the protrusion to vary the gap therebetween and thereby effect flow control by throttling and cavitation shutoff. When the injector mounting means is axially biased toward the injector head, the injector gap is selectively varied to thereby effect injector velocity control.

The invention will become better understood by reference to the following detailed description when considered in conjunction with the accompanying drawings.

DESCRIPTION OF THE PREFERRED EMBODIMENTS

Figure 1:
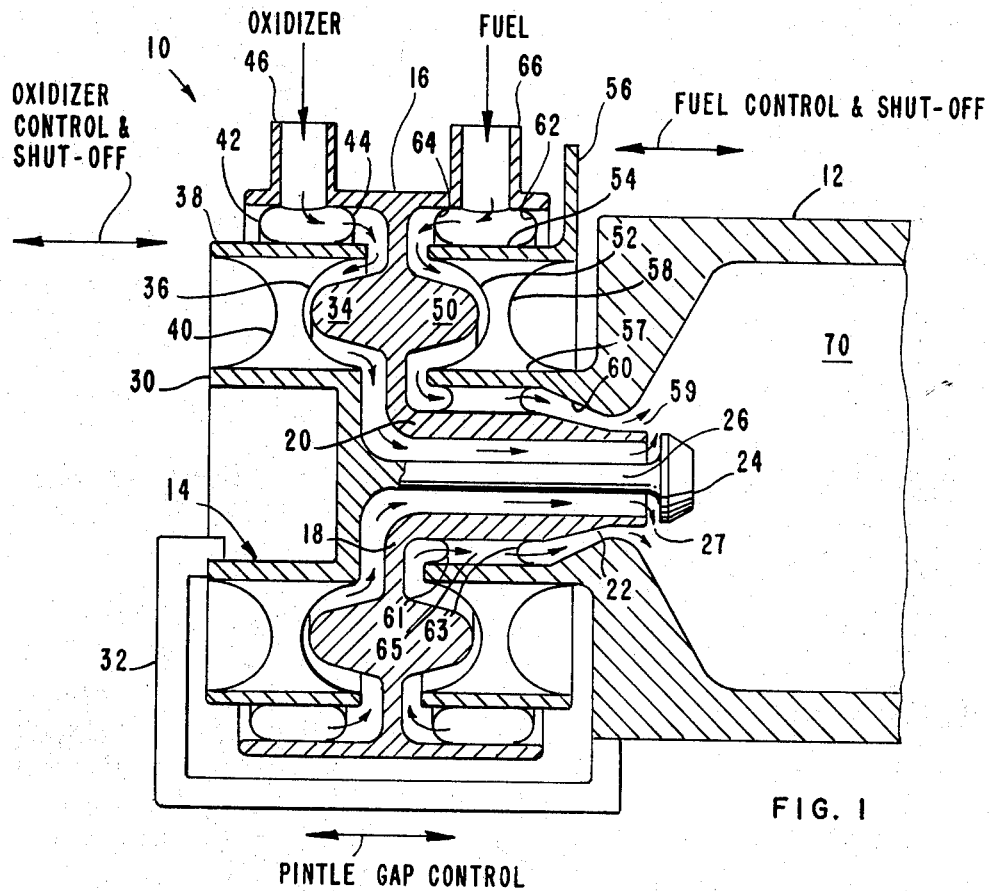
FIG. 1 is a cross sectional view of an embodiment of the integral bi-liquid control valve and injector of the invention shown in relation to a partial section of an injection chamber.
Figure 2:
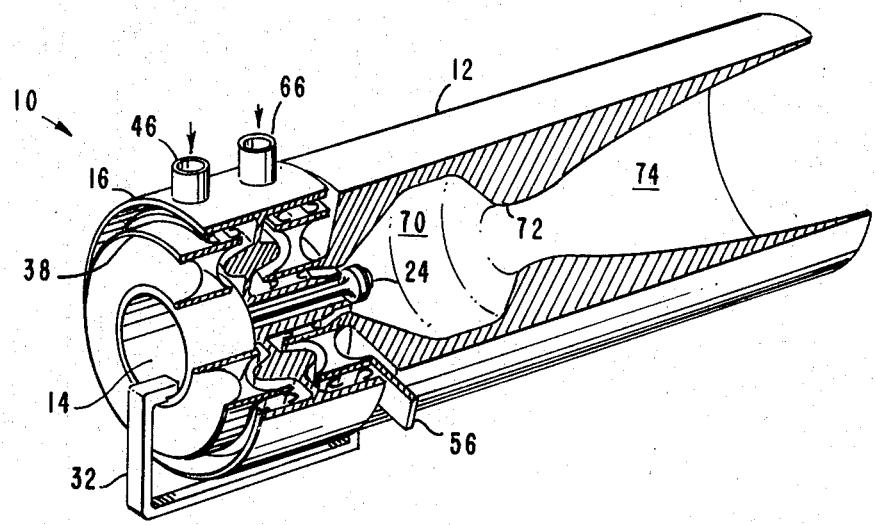
FIG. 2 is a perspective illustration partly in section of the integral valve-injector of the invention shown in connection with a combustion chamber and nozzle.

Referring now to FIGS. 1 and 2, the valve-injector unit of the invention is illustrated with arrows indicating direction of propellant and oxidizer flow and movement of the control sleeves. The valve-injector unit includes generally a housing 10, an injector chamber body 12 and a pintle mounting member 14. The housing 10 includes an outer cylindrical casing 16 within which is mounted a disk member 18 supporting an axially disposed annular cylinder 20. A set of flow channels for the injector portion of the unit is formed on each side of the annular cylinder 20. The cylinder 20 is tapered at its outer extremity to a converging neck portion 22 which terminates short of the pintle head 24. A pintle head support rod 26 is axially disposed within cylinder 20 and the rod is attached to the end plate 28 of a fixed cylindrical member 30. The annular cylindrical member 30 is rigidly attached to the injector body 12 by means of a support 32.

The oxidizer valve circuit is formed as shown on the left hand side of the valve and includes an arcuate annular protrusion 34 mounted on disk member 18. A valve chamber is formed by the annular space between said protrusion 34 and a semi-toroidal metal diaphragm 36. The inner edge of diaphragm 36 is attached to the fixed cylindrical member 30 while the outer edge of the diaphragm is mounted on the inside of the oxidizer control sleeve 38. An additional point of flexural attachment between these two members is provided by another resilient flexible semi-toroidal diaphragm 40. The control sleeve 38 is flexurally mounted to the outer casing 16 by means of a set of semi-toroidal flexible metal diaphragms 42 and 44 which are mounted on each side of oxidizer inlet 46. The inner diaphragm 44 is perforated to provide flow into the leading edge of the annular valve chamber. The diaphragms which are subjected to the forces of flow preferably present a concave surface to the flow to minimize distortion and buckling.

Oxidizer flows from the inlet 46 into the annular inlet space formed between the diaphragms 42 and 44, the outer casing 16 and the oxidizer control sleeve 38. The oxidizer then flows through the perforations in diaphragm 44 and around the edge of the sleeve 38 into the annular valve chamber. The oxidizer is throttled as it passes through the gap formed between the apex of the protrusion 34 and the opposite diaphragm portion and cavitates on the downstream side of the valve chamber formed by the diaphragm and the downstream side of the protrusion. Oxidizer then flows past the juncture of the annular cylinder 20 and the disk 18 into the annular injector passage. The passage is formed in the space between the inside wall of cylinder 20 and the pintle support rod 26. The oxidizer enters the pintle gap 27 formed between the pintle head 24 and the terminus of the converging neck 22 of the annular cylinder 20. The oxidizer is dispersed as it leaves the gap.

Referring now to the right hand side for the fuel control circuit, a similar annular, arcuate shaped protrusion 50 is mounted on the right hand face of the disk 18. The protrusion 50 is at least partially surrounded by a flexible metal semitoroidal diaphragm 52. The outer edge of the diaphragm 52 is welded to a fuel control sleeve 54 which contains a flange 56 to which actuating means or axial forces may be applied. The inner edge of the diaphragm 52 is attached to an annular cylindrical extension 57 of the injector chamber body 12. Flexural attachment between the sleeve 54 and the extension 57 is provided by an additional semi-toroidal metal diaphragm 58. The cylindrical extension 57 surrounds the annular cylinder 20 and is co-axial therewith and contains a converging neck portion 60 shaped to cooperate with the converging neck 22 on the annular cylinder 20 to form an annular fuel injector orifice 59. The extension 57 is maintained axially separated and flexurally attached to the annular cylinder 20 by means of perforated diaphragms 61 and 63. The annular space 65 between these members forms the injector fuel channel.

The fuel control sleeve 54 is flexurally attached to the outer casing 16 by means of a set of semi-toroidal diaphragms 62 and 64 which are attached to these members on each side of the fuel inlet pipe 66. The inner diaphragm 64 is again perforated to permit flow therethrough. Fuel enters the inlet 66, flows through the diaphragm 64 and around the edge of sleeve 54 into the annular valve chamber formed between the protrusion 50 and the diaphragm 52. The fuel flows past the gap between the tip of the protrusion 50 and the opposing diaphragm into the downstream portion of the chamber which is shaped to cause cavitation of the fuel. The fuel leaves the chamber and flows around the edge of cylindrical extension 57 into the annular space 65 formed between the extension 57 and the annular cylinder 20. The fuel is dispersed as it flows out the injector orifice 59 formed between the respective neck portions 22 and 60 and it mixes with the oxidizer flowing laterally out of the pintle gap 27 of the injector. The mixed stream of liquid enters the injector chamber 70 and is ignited. The combusted gases enter the nozzle throat 72 and provide propulsion force as they expand into the nozzle chamber 74.

In the valve-injector unit of the invention, two fluids, oxidizer and fuel, are exhausted from the same side of the control valve and into the variable thrust injector chambers. Flow control, shutoff and pintle gap control are accomplished by moving sleeves which are mounted on semi-toroidal diaphragms. Oxidizer flow control is achieved by applying actuating forces to the oxidizer control sleeve 38 to vary the gap between the apex of annular protrusion 34 and valve diaphragm 36. Flow control of the fuel results when the gap between annular protrusion 50 and the opposing semi-toroidal diaphragm 52 is changed by applying actuating control forces to the flange 56 of fuel control sleeve 54. Oxidizer or fuel shutoff results when the semi-toroidal diaphragm is forced over the annular protrusions giving a metal to metal seal.

Movement of the main outer cylindrical casing 16 results in simultaneous change and control of the oxidizer and fuel injector gaps 27 and 59. The casing 16 is rigidly attached through the disk member 18 to the annular cylinder 20. The pintle head 24, pintle rod 26, pintle mounting member 14 and the injector chamber body 12 and its cylindrical extension 57 form a second rigid assembly. Thus, axial movement of cylinder 20 which is flexurally attached to extension 57 simultaneously varies the gap 27 between the outer extremity of this cylinder and the pintle head forming the oxidizer injector orifice and the gap 59 formed between the tapered portion of the cylinder 22 and the opposing neck portion of the injector chamber extension 57 which functions as the fuel injector orifice.

Axial movement of the casing 16 to the right will tend to close the fuel flow control gap and open the oxidizer flow control gap unless the sleeve actuating means are coupled to the casing actuating means. The flow control gaps can also be maintained in a preset condition by independent actuation of the sleeves to maintain a selected gap setting. The gaps on the oxidizer or the fuel sides of the valve may be set individually or in such a way as to maintain a constant mixture ratio control.

The diaphragm mountings allow axial movement of either the inner or outer circumference of the sleeves or of the housing with respect to the opposing circumference with no sliding or rotation. The semi-toroidal diaphragms of the invention are simultaneously utilized to control flow rate by cavitation and throttling, to flexurally mount control sleeves and negate the need for seals. All actuation for flow control, shutoff and pintle gap control is accomplished by axial movement of cylindrical sleeves which are mounted by means of semi-toroidal diaphragms.

Due to the large diameter of the seat of the valve, very little relative movement between the protrusion and the diaphragm and very small gaps are required for very sensitive control of large flow rates. The profile of the chamber defined between the protrusion and the diaphragm simulates that of a cavitating venturi. The fluid flows from a converging annulus, through a restricted orifice, into a diverging annulus. With cavitation controlled flow rate, upstream pressure is rendered relatively insensitive to downstream pressure conditions.

At no time are dissimilar liquids flowing on opposing side of welds in the valve-injector of the invention. The unit is of all metal welded construction and mainly of simple cylindric shapes and can, therefore, be simply fabricated at relatively low cost.

The valve of the invention has been fabricated and tested. Both throttling capability and cavitation were demonstrated. It was found that very high flow rates could be obtained for very small gap settings between the diaphragm and the protrusion. Very slight changes in the gap result in large changes of flow rate. Cavitation capability for values of downstream pressures of up to 75% upstream pressures were demonstrated.

It is to be realized that only preferred embodiments of the invention have been illustrated and that numerous substitutions, alterations and modifications are permissible. For example, the diaphragms facing the protrusion may be pressure balanced on their reverse side to reduce distortion by deflection and to reduce the required operating force. Furthermore, many actuating means are permissible such as the use of pneumatic signals from the fuel and oxidizer controller to directly actuate axial movement of the fuel and oxidizer and pintle control sleeves.

It is therefore understood that these and other modifications, substitutions and alterations are all permissible without departing from the scope of the invention as defined in the following claims.

What is claimed is:

1. An integral valve and injector unit comprising in combination:
   an annular-shaped arcuate protrusion having an annular, circular cross-section and having sides converging to an apex;
   means for supporting said annular-shaped protrusion;
   flexible semi-toroidal diaphragm means axially disposed with respect to said protrusion with the inner, concave surface thereof substantially surrounding said protrusion thereby defining an annular flow valve chamber having a converging annulus inlet portion, a restricted orifice defined by the gap between said apex and the opposing inner wall surface of said diaphragm and a diverging annular outlet portion;
   means defining an axial injector passage having a first and a second terminus;
   a variable injector orifice disposed at the first terminus of said passage;
   means communicating the second terminus of said passage and the outlet portion of said chamber; and
   means for delivering inlet fluid to the inlet portion of said valve chamber.

2. A device according to claim 1 in which one edge of said diaphragm is attached to a cylinder flexurally mounted for axial movement whereby on axial movement of the cylinder the gap between the diaphragm and the protrusion is varied and the flow through the annular chamber is controlled.

3. A device according to claim 1 including a set of co-axial cylinders defining an axial annular injector passage therebetween and an orifice at the ends thereof, at least one of said cylinders being flexurally mounted for axial movement to vary said injector orifice.

4. A device according to claim 1 including an injector passage defined by a cylinder flexurally mounted for axial movement and a pintle head disposed at the exit of said cylinder to define an injector orifice.

5. A device according to claim 1 in which a first and second annular arcuate protrusion is attached to opposed surfaces of said support means and a first and second flexible metal diaphragm at least partially surrounds each protrusion to define a first and second annular valve chamber and said support means.

6. A device according to claim 5 including co-axial first and second variable injector orifices for receiving the flow from said first and second valve chambers.

7. An integral bi-liquid valve and co-axial injector comprising in combination:
   a cylindrical housing;
   an annular plate connected to the interior surface of said housing defining an axial passage;
   first and second annular protrusions fixedly mounted on each side of said plate;
   first and second flexible, semi-toroidal metal diaphragms at least partially surrounding each of said protrusions to define a first and second annular flow control valve chamber;
   sleeve means flexurally mounted for axial movement attached to at least one edge of said first and second semi-toroidal diaphragms;
   a concentric annular cylinder attached to the passage in said annular plate for receiving the flow from said first valve chamber;
   a co-axial cylinder mounted for axial movement flexurally attached to said concentric cylinders defining therebetween an annulus for receiving the flow from said second valve chamber;
   a first and second variable injector orifice disposed at the terminus of said concentric and co-axial cylinders; and
   means for delivering liquid to each of said flow chambers.

References Cited
UNITED STATES PATENTS

| | | | |
|---|---|---|---|
| 3,064,903 | 10/1962 | Butler | 239—416 X |
| 3,232,049 | 2/1966 | Rhodes | 239—416 X |
| 3,430,863 | 4/1969 | Canavan et al. | 239—416 X |
| 3,462,950 | 8/1969 | Chevalaz | 137—607 X |

M. HENSON WOOD, JR., Primary Examiner

J. J. LOVE, Assistant Examiner

U.S. Cl. X.R.

239—408, 424